March 2, 1948. J. S. HILL 2,436,804
PROCESS OF RECOVERING ORGANIC COMPOUNDS
Filed July 19, 1943
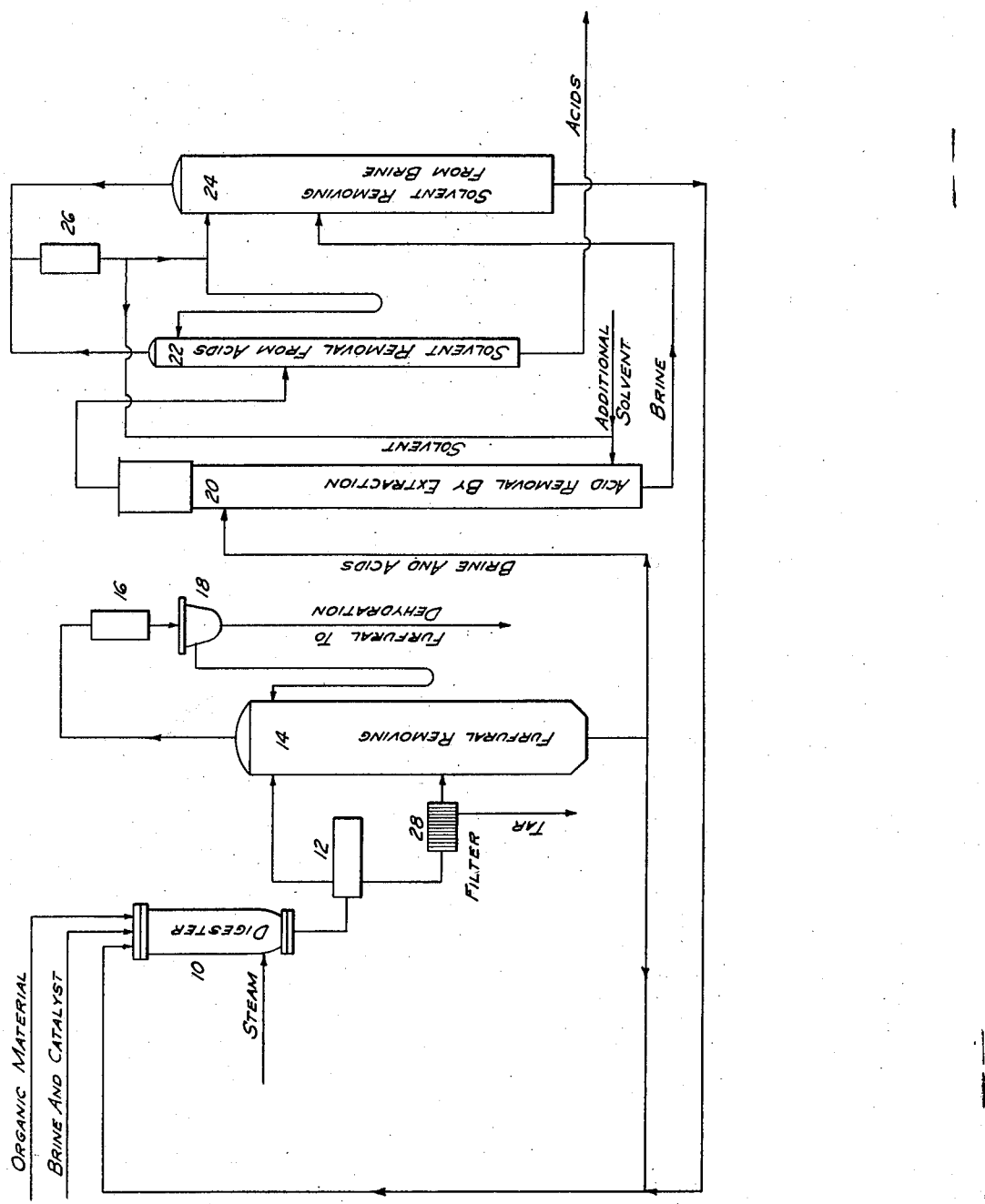
INVENTOR.
JOHN STANLEY HILL
BY
ATTORNEY Patented Mar. 2, 1948

2,436,804

UNITED STATES PATENT OFFICE 2,436,804

PROCESS OF RECOVERING ORGANIC COMPOUNDS

John Stanley Hill, Laurel, Miss., assignor to Masonite Corporation, Laurel, Miss., a corporation of Delaware Application July 19, 1943, Serial No. 495,383

11 Claims. (Cl. 260—347)

This invention relates to an improvement in the production of furfural and organic acids, such as acetic and formic acids, from organic materials containing pentosans, hexosans and similar compounds by the acid hydrolysis of such materials, and is especially directed to the use of, and the results obtained by the use of, a salt brine in the manufacture of the above named products.

The basic steps involved in making such products comprise the acid digestion of the organic material containing pentosans, hexosans and similar compounds, such as oat hulls, cottonseed hulls, liquors from wood or other ligno-cellulose materials and containing pentosans, hexosans and similar compounds in soluble or dispersed or colloidal state, as described in U. S. Patent No. 2,224,135, and the like, disposition of remaining solids and/or of materials such as tars and the like which are present or formed during the digestion treatment, recovery of the furfural so produced, extraction of the mixed organic acids from the water present during the digestion, and finally the separation and purification of the organic acids.

By the addition of brine in the digesting step and utilizing the brine in this and subsequent steps, I am enabled to secure advantageous results in the several steps which are involved.

One object of the invention is the reduction of the time required for the digestion step and to secure improved digestion. Another object is to effect a more satisfactory separation of unreacted solids and/or tars which may be present or formed and like materials from the desired organic compounds. Another object is the provision of a process whereby brine-making salts and catalyst can be recovered and re-cycled and re-used for providing the brine for digestion of further materials containing pentosans, hexosans and the like.

One of the greatest difficulties heretofore encountered has been in the extraction of the organic acids from the water by the use of solvents, especially by solvents which are largely insoluble in water. With the use of such solvents an undesirably great quantity of solvent was required because of low partition coefficients, that is to say, because the solubility of such acids in such solvents is low relative to the solubility of such acids in water. With the present invention solvents highly soluble in water can be used, thereby making the partition coefficients more favorable, and minimizing the amount of solvent needed.

One of the objects of making use of brine in accordance with the present invention is to reduce greatly the amount of solvent required to effect the extraction of organic acids from water.

Further objects of the invention will be made apparent by the following description.

When wood liquor such as described in U. S. Patent 2,224,135 is utilized, it is preferably converted to a brine by the addition of a large amount of water soluble metal salts, preferably sodium salts, which are sufficiently stable to resist oxidation or reduction under conditions such as herein described, such for example as sodium chloride, sodium sulfate or the like. A saturated solution of the salt material gives good results but so strong a brine is not essential in all cases. Mineral acid such as about 1-2% of sulfuric acid is added to the brine to act as a catalyst, with or without additional catalytic material such as .05-.5% of aluminum sulfate. In case of digestion of solid material such as wood, oat hulls, cottonseed hulls and the like, the salt material is made into a brine with addition of water.

The material containing pentosans, hexosans and similar compounds in brine is subjected to a hydrolysis or digestion treatment. Steam pressures of from 60 p. s. i. to 1000 p. s. i. or over, and preferably about 200–1000 p. s. i., may be satisfactorily used. The time required for my hydrolysis treatment can vary from about 1 or 2 hours for 60 p. s. i. to a fraction of a minute for 1000 p. s. i. The brine appears to aid in effecting the reactions involved in the production of furfural from pentosans, and to reduce the time required for digestion treatment. When high steam pressures are used, the hydrolysis treatment is preferably terminated and solid materials subdivided by explosive discharge of the digested materials.

During such discharge there will be a considerable flashing-off of furfural vapors and other low-boiling material such as volatile organic acids, alcohol, acetone, etc., which may readily be collected and condensed. The liquor portion may then be treated, as by filtration, to remove the solids present or formed, as for example tars and the like. The salt appears to aid in this separation and a substantially clear brine can be obtained.

After suitable filtration, or even before, if so desired, the brine containing furfural, organic acids, etc., may be fed to a distilling column where the remaining furfural can be removed. If desired, a portion of the remaining organic acid-containing briny liquid may be re-cycled to the digestion apparatus to build up the content of organic acid. Unduly great build-up of organic acid content should be avoided, however, since the solvent recovery of organic acids hereinafter referred to has best application when the acid content is fairly low.

The brine solution material remaining after distilling off furfural and containing organic acids is then subjected to solvent extraction treatment to recover the acids, preferably in an extraction column. Such extraction is preferably carried out by passing such brine solution into one end of a vertical extraction column, while passing the solvent in at the other end. With use of light organic solvents such as various alcohols, acetone or the like, having specific gravities which are less than that of water, the brine solution will be fed to the top of the extraction column.

In my extraction treatment solvents or mixtures of solvents are used which are infinitely soluble, or at least highly soluble, in water, for example, ethyl or methyl alcohol, the propyl alcohols, acetone, methyl ethyl ketone, and the like, or mixtures thereof. Since these solvents are not very soluble in the brine, and the organic acids are more soluble in the solvents than in the brine, the solvent takes up most of the acid together with a small part of the water from the brine. Thus the partition coefficients are very favorable to the solvents, and accordingly relatively small portions of solvent are required to effect the extraction. The partition coefficient of methyl ethyl ketone, for example, was found to be several times the normal partition coefficient of about 0.8 of furfural which is the solvent generally preferred for use in the extraction of organic acids such as acetic and formic acids. The partition coefficient for acetone is even higher than for methyl ethyl ketone.

From the top of the extraction column there is obtained a liquid containing with the solvent the bulk of the organic acid material that was present in the brine solution, and some water. The acid concentration of this liquid has been found to be as high as 30% when using acetone, and as high as 65% when using methyl ethyl ketone, these figures based on the water-acid content not including the solvent.

As already noted, while the acid content of the brine may be built up by recycling after recovery of furfural and some build-up is useful, too great acid concentration is to be avoided since the solvents have less favorable partition coefficients when the acid content is unduly high.

The solvent may be recovered by distillation and re-cycled to the extraction column. Recovery and purification of the organic acids may be effected by known methods.

From the bottom of the extraction column is obtained the brine solution, containing substantially all the salt and catalysts initially employed, and a relatively small proportion of the solvent material. This solvent may be recovered by distillation.

After recovery of the solvent, of which relatively little need be used in accordance with the present invention, the catalyst-containing brine may be re-cycled to be re-used in the digestion step. If the material taken for digestion already contains much water, as will be the case when wood liquors, for example, are digested, it may be desirable to remove the water largely or entirely from the brine before re-using the salt and catalyst.

The invention will be more specifically illustrated by description in connection with the attached drawing which shows a flow sheet of one of the preferred embodiments of the method for the improved separation of the organic compounds from the brine liquors.

Material containing pentosans, hexosans, and similar organic compounds, a brine solution, and a catalyst are fed to the digester 10 and subjected to a hydrolysis treatment, preferably by high pressure steam, to effect conversion of the organic compounds to various organic products such as furfural, organic acids or the like. Generally tars or tarry-like materials are also formed during the conversion.

The contents of the digester are discharged to the receiver 12 and furfural vapors are flashed off to the furfural removing column 14. The brine liquor containing acids, and some furfural, may be recycled to the digester 10 in order to increase the acid concentration in the brine if so desired. If no recycling of the brine from the receiver is necessary, the liquor is pumped into the furfural removing column 14 where the remaining portion of the furfural is removed. The furfural vapors which may include some entrained acids pass through condenser 16 and into the decanting unit 18. The entrained acids are recycled again into the column 14 and the furfural is then subjected to a dehydration action.

The tars or other insoluble materials may be removed from the brine containing furfural, organic acids, etc., before being fed into the furfural removing column by passing through a filter 28. It is, however, not necessary to remove the solids at this point of the cycle since the removal may be effected after the furfural has been removed.

After the furfural has been removed, the brine-containing organic acids, etc., are fed to the acid removal column 20 where solvents, such as acetone, contact the brine and the acids are extracted from the brine by means of the solvents. The solvents, as explained above, are very soluble in water but not very soluble in brine, and the organic acids are more soluble in the solvent than in the brine. As result of the different solubilities, the solvent and brine will separate into layers, the solvent layer containing most of the organic acids.

The solvent layer containing organic acids is then treated in a distillation column 22 to remove the solvent from the acids. The solvent is removed in the form of a vapor from the top of the column, passed through condenser 26, and fed back into acid extraction column 20.

The brine layer contains a quantity of solvent and this solvent is recovered by distilling off the solvent in column 24. The solvent vapors are moved with vapors coming from column 22 and then condensed in 26. If the condensed solvents still contain entrained acids and/or brine after passing through the condenser 26, the condensed solvents may be refluxed in columns 22 or 24, for further purification of the solvent.

After the solvent has been recovered from the brine, the brine which still contains the catalyst originally added in the digester is recycled to digester 10 for further use in the operation.

As an example to show the improved separation of organic acids from the brine liquor by means of various organic solvents, the following data are presented. In this example, digested liquor containing NaCl was filtered, after which it was extracted with various solvents. The following data show the results obtained: (The NaOH used for titration was 0.1033N).

| | Vol. Liquor | Vol. Solvent | Temp., °C. | Aqueous Layer | Solvent Layer | Partition Coeff. |
|---|---|---|---|---|---|---|
| 1 | Cc. | Blank | 29 | 1 cc.=10.75 cc. NaOH | | |
| 2 | 25 | 10 cc. acetone | 29 | 30 cc. 1 cc.=7.1 cc. NaOH | 5 cc. 1 cc.=12.5 cc. NaOH | 1.76 |
| 3 | 25 | 10 cc. furfural | 29 | 25 cc. 1 cc.=7.3 cc. NaOH | 10 cc. 1 cc.=8.1 cc. NaOH | 1.11 |
| 4 | 25 | 10 cc. methyl ethyl ketone | 29 | 25 cc. 1 cc.=6.3 cc. NaOH | 10 cc. 1 cc.=9.9 cc. NaOH | 1.57 |
| 5 | 25 | 10 cc. acetone | 45 | 30 cc. 1 cc.=6.9 cc. NaOH | 5 cc. 1 cc.=12.5 cc. NaOH | 1.83 |
| 6 | 25 | 10 cc. methyl ethyl ketone | −5 | 24.5 cc. 1 cc.=6.3 cc. NaOH | 9.5 cc. 1 cc.=10.75 cc. NaOH | 1.71 |
| 7 | 25 | do | 10 | 25 cc. 1 cc.=6.3 cc. NaOH | 10 cc. 1 cc.=10.3 cc. NaOH | 1.64 |
| 8 | 25 No salt | 25 cc. methyl ethyl ketone | 29 (Mutual solubility high) | 28 cc. 1 cc.=6.7 cc. NaOH | 23 cc. 1 cc.=6.7 cc. NaOH | 1.00 |

If no brine solutions had been used in carrying out the above procedures, such organic solvents as acetone could not have been used, since acetone is very soluble in water and no separation of acids from the hydrolyzed liquors could be made. Methyl ethyl ketone could have been used without using a brine solution, because this compound is not completely soluble in water, but the partition coefficient was considerably lower as compared to the partition coefficient when the same solvent was used on digested liquors in brine. Furfural also shows an improved partition coefficient when acid extractions are made from liquors containing such organic compounds in the presence of brine as compared to extractions from liquors without the addition of a brine solution.

In another example, digested liquor containing $Na_2SO_4$ was filtered, after which it was extracted with various solvents. The following data show the results obtained: (The NaOH used for titration was 0.1033N). The temperature for these extractions was 29° C.

| | Vol. Liquor | Vol. Solvent | Aqueous Layer | Solvent Layer | Partition Coeff. |
|---|---|---|---|---|---|
| 1 | Cc. 25 | 10 cc. acetone | 19 cc. 1 cc.=4.3 cc. NaOH | 16 cc. 1 cc.=12.1 cc. NaOH | 2.82 |
| 2 | 25 | 10 cc. ethanol | 17.5 cc. 1 cc.=4.5 cc. NaOH | 17.5 cc. 1 cc.=10.5 cc. NaOH | 2.30 |
| 3 | 25 | 10 cc. methyl ethyl ketone | 23 cc. 1 cc.=5.4 cc. NaOH | 12 cc. 1 cc.=11.5 cc. NaOH | 2.13 |

In the foregoing tables under the headings "aqueous layer" and "solvent layer" there are included, in addition to the volumes of the respective layers, titration figures for determination of organic acid content.

The partition coefficient results obtained by using $Na_2SO_4$ are better than when using NaCl as the salt in the brine. The partition coefficients will vary considerably with various salts as indicated above, and in some cases were as high as 8 when using acetone under favorable temperatures such as 30° C. or lower and with brines containing $Na_2SO_4$ as the salt.

The importance of using organic solvents to obtain efficient separation of organic acids from brine solutions will thus be apparent; and, although the conditions of operation may be varied broadly, I intend that such variations shall fall within the scope of the present claims.

I claim:

1. Process of manufacturing furfural and organic acids from material from which furfural, acetic and formic acids can be produced, which comprises the step of incorporating water-soluble metal-salt brine with said material, subjecting said material and brine to acid digestion, condensing and recovering the furfural produced, and treating the brine-containing organic acid with solvent material highly soluble in water to separate the mixed organic acid from the brine.

2. Process as described in claim 1, in which the brine is recycled to the digestion step.

3. Process of manufacturing furfural and organic acids from material from which furfural, acetic and formic acids can be produced, which comprises the steps of incorporating water-soluble metal-salt brine with said material, subjecting said material to digestion with steam under pressure in the presence of an acid catalyst, condensing and recovering the furfural produced, treating the brine-containing organic acid with solvent highly soluble in water to separate the mixed organic acids from the brine, and recovering the organic acids from the solvent.

4. Process as described in claim 3, in which the brine is recycled to the digestion step and the recovered organic solvent is recycled to the acid-from-the-brine-separation step.

5. Process of manufacturing furfural and organic acid from material from which furfural, acetic and formic acids can be produced by acid digestion, the steps of incorporating sodium sulfate brine and an acid catalyst with the said material, subjecting the mixture to digestion with steam under pressure, condensing and recovering the furfural, extracting the mixed organic acids from the brine with acetone, and separating the organic acids from the acetone.

6. Process as described in claim 5, in which the brine is recycled to the digestion step.

7. Process as described in claim 5, in which the brine is recycled to the digestion step and the recovered acetone is recycled to the acid-from-the-brine-separation step.

8. In a process of manufacturing furfural and organic acid from material from which furfural, acetic and formic acids can be produced by acid digestion, the steps of incorporating sodium chloride brine and an acid catalyst with the said material, subjecting the mixture to digestion with steam under pressure, condensing and recovering the furfural, extracting the mixed organic acids from the brine by means of a solvent which is highly soluble in water, and separating the acids from the solvent.

9. Process as described in claim 8, in which the brine is recycled to the digestion step.

10. Process as described in claim 8, in which the brine is recycled to the digestion step and the recovered solvent is recycled to the acid-from-the-brine-separation step.

11. Process of manufacturing furfural and organic acids from material from which furfural, acetic and formic acids can be produced by acid digestion, the steps of incorporating sodium sulfate brine and an acid catalyst with said material, subjecting the mixture to digestion with steam under pressure, condensing and recovering the furfural, extracting the mixed organic acids from the brine with methyl ethyl ketone, and separating the organic acids from the methyl ethyl ketone.

JOHN STANLEY HILL.

REFERENCES CITED

The following references are of record in the file of this patent:

UNITED STATES PATENTS

| Number | Name | Date |
|---|---|---|
| 2,078,241 | Fulmer et al. | Apr. 27, 1937 |
| 2,369,655 | Boehm | Feb. 20, 1945 |
| 2,033,978 | Dreyfus | Mar. 17, 1936 |
| 1,996,706 | Koster | Apr. 2, 1935 |

FOREIGN PATENTS

| Number | Country | Date |
|---|---|---|
| 495,116 | France | June 18, 1919 |
| 21,602 | France | Aug. 24, 1920 |
| 642,246 | Germany | Feb. 26, 1937 |